(12) United States Patent
Kiang et al.

(10) Patent No.: US 6,453,151 B1
(45) Date of Patent: Sep. 17, 2002

(54) METHOD OF REDUCING RESOURCE ASSIGNMENT OVERHEAD IN WIRELESS COMMUNICATION SYSTEMS

(75) Inventors: T. Roger Kiang, Basking Ridge; Tejaskumar R. Patel, Lake Hiawatha; Sudhir Ramakrishna, Scotch Plains, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/336,921

(22) Filed: Jun. 21, 1999

(51) Int. Cl.[7] .............................. H04B 7/26; H04M 3/22
(52) U.S. Cl. ........................ 455/67.1; 455/67.3; 455/63
(58) Field of Search ............................ 455/67.1, 67.3, 455/63, 67.4, 424, 425

(56) References Cited

U.S. PATENT DOCUMENTS

| | | | | |
|---|---|---|---|---|
| 5,694,451 A | * | 12/1997 | Arinell | 379/34 |
| 6,006,077 A | * | 12/1999 | Shull | 455/226.2 |
| 6,137,991 A | * | 10/2000 | Isaksson | 455/67.1 |
| 6,233,454 B1 | * | 5/2001 | Sato | 455/437 |

* cited by examiner

*Primary Examiner*—Daniel Hunter
*Assistant Examiner*—Alan T. Gantt

(57) ABSTRACT

A method is described to reduce the time required to assign the burst transmission parameters in a wireless communication system by autonomously sharing transmission and reception information among the components of the network. Information is autonomously provided from a remote subnetwork element to a controlling network element so the controlling network element may use the information to dynamically assign and update burst transmission parameters.

26 Claims, 3 Drawing Sheets

METHOD OF REDUCING RESOURCE ASSIGNMENT OVERHEAD IN WIRELESS COMMUNICATION SYSTEMS

FIELD OF THE INVENTION

This invention relates to wireless communication systems and, more particularly, to methods for assignment of system transmission parameters for high speed transmission in such communication systems.

BACKGROUND OF THE INVENTION

Wireless communication systems have been developed to allow transmission of information signals between an originating location and a destination location. Both analog (first generation) and digital (second generation) systems have been developed to transmit information signals over communication channels linking the source and destination locations. Digital methods tend to afford several advantages over analog systems. For example, improved immunity to channel noise and interference, increased capacity, and encryption for secure communications are advantages of digital systems over analog systems.

While first generation systems were primarily directed to voice communication, second generation systems support both voice and data applications. Numerous techniques are known in second-generation systems for handling data transmissions which have different transmission requirements. In particular, data transmissions, typically, are of relatively short duration whereas voice transmission is of a longer duration and requires continuous access to the communication channel. Several modulation/coding arrangements have been developed, such as frequency division multiple access (FDMA), time division multiple access (TDMA), and code division multiple access (CDMA), to increase the number of users that can access a wireless network. CDMA systems are more immune to multiple path distortion and co-channel interference than FDMA and TDMA systems and reduce the burden of frequency/channel planning that is common with FDMA and TDMA systems.

In a CDMA system, a unique binary code sequence is assigned to each active user within a cell to uniquely identify the user and spread the user's signal over a larger bandwidth. Multiplied by the assigned code, the user's signal is spread over the entire channel bandwidth, which is wider than the user's signal bandwidth. The ratio of the system channel bandwidth to the user's bandwidth is the "spreading gain" of the system. The capacity of the CDMA system is proportional to the "spreading gain" for a given signal-to-interference (S/I) level. After reception of the transmitted signal, the signal of each user is separated, or de-spread, from the signals of other users by using a correlator keyed to the code sequence of the desired signal.

First-generation analog and second-generation digital systems were designed to support voice communication with limited data communication capabilities. Third-generation wireless systems, using wide-band multiple access technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the bursty nature of such high-speed data services in third-generation systems, it is necessary for the communications system to assign a large bandwidth segment (corresponding to the high data rate) from time to time for the duration of the data burst. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same basic frequency allocation.

In establishing a high speed burst communication link, a land-line network base station and a mobile terminal (or station) agree upon a service configuration that is to be used by the base station and the mobile station. Transmission data rate and nominal initial output power are service configuration parameters that must be assigned before the burst transmission can begin. During the establishment of the communication link, a prearranged protocol of command messages and responses are exchanged between the base station and the mobile station. Among these protocol messages is a request, made by the base station, for a measure of the signal strength received at the mobile station. The base station requests the signal strength measurement be performed by transmitting a Pilot Measurement Request Order (PMRO) message. The mobile station, in response, measures the received signal strength, and returns this measurement to the base station through the Pilot Signal Measurement Message (PSMM). The base station then assigns the burst transmission parameters with a goal of providing an acceptable quality of service using a minimum of system resources.

To maintain acceptable signal reception and quality, with a minimum of system resources, it would be advantageous to adjust the base station initial output power level, transmission data rate and bandwidth in response to the dynamics of the wireless environment. However, to continuously adjust the transmission parameters requires the base station to repeatedly request that the mobile station report the received signal strength each time the mobile station makes a burst request. Each such request introduces delay in the transmission of the burst and contributes to an inefficient utilization of the channel resources.

SUMMARY OF THE INVENTION

It is an object of the invention to improve the efficiency of the communication link utilization in a wireless communication network by making system parameters of remote sites available to local controllers. It is a further object of the invention to provide a method of reporting system parameters from remote sites to local controllers in an efficient manner. It is a still further object of the invention to reduce the time required to assign burst transmission parameters by providing system parameter data to a local controller in a efficient manner. It is a further object of the invention to provide a method of obtaining system data that may be used to dynamically assign burst transmission parameters during a burst transmission.

According to the method of the invention, remote sites autonomously report system data to a local controller and the local controller uses this information to allocate transmission parameters and improve system performance. More specifically, in a wireless communication network, after a local controller, such as a base station, and a remote site, such as a mobile station, have established a communication link for burst transmissions, the remote site mobile station autonomously reports system parameter information to the local controller base station such that the local controller may adjust the burst transmission parameters based on the reported signal parameter values.

Further, the base station collects the reported system parameters and in combination with base-station-specific system information, such as cumulative power history and Signal to Interference Ratio (SIR), reports this information, via its associated link, to a mobile switching center, which is a local controller of a network of base stations.

In a further embodiment of the invention, both the base station and the mobile station employ time-out arrangements, such that if data is not received within known time periods from the last data message received, the data session between the mobile station and the base station is deemed ended (cleared) and the mobile station and base station proceed to end their communication link processing.

In accordance with the method of the invention, and with specific applicability to the communication link between a mobile station and a base station, the autonomous reporting of such data as the measured signal strength provides the base station with information to update and optimize burst transmission parameters, without delaying the transmission and without incurring channel overhead that otherwise would be necessary to obtain this information. Thus, the invention provides an improvement in system operation without incurring the expense of delayed transmissions or inefficient channel utilization.

DETAILED DESCRIPTION OF THE INVENTION

The focus of early wireless systems, particularly first generation analog systems, was primarily voice communication. With second generation wireless systems, including CDMA, TDMA and GSM, came varying degrees of improvement in terms of voice quality, network capacity and enhanced services. However, while second generation systems are suitable to the provision of voice, low rate data, fax and messaging, they are generally not able to effectively and efficiently address requirements for high speed mobile data rates. The evolution to third generation wireless communications represents, essentially, a paradigm shift to the world of multimedia mobile communications, where users will have access not just to voice services but also to video, image, text, graphic and data communications. The third generation networks are expected to provide mobile users with data rates of between 144 Kbps and 2 Mbps.

Nonetheless, in wireless networks supporting these higher speed data communications applications, channel overhead must be managed very carefully to avoid delays caused, for example, by the communication link initialization sequence. As will be shown hereafter, the invention provides a novel method to monitor system parameters of the wireless communications network, thereby providing reduced time delay in assigning burst transmission parameters and improved operating efficiency. While the invention will be hereafter described in terms of a preferred embodiment based on CDMA encoding of the wireless signals, it should be apparent that the methodology of the invention can also be applied for other wireless channelization arrangements, including TDMA and GSM.

Figure 1:
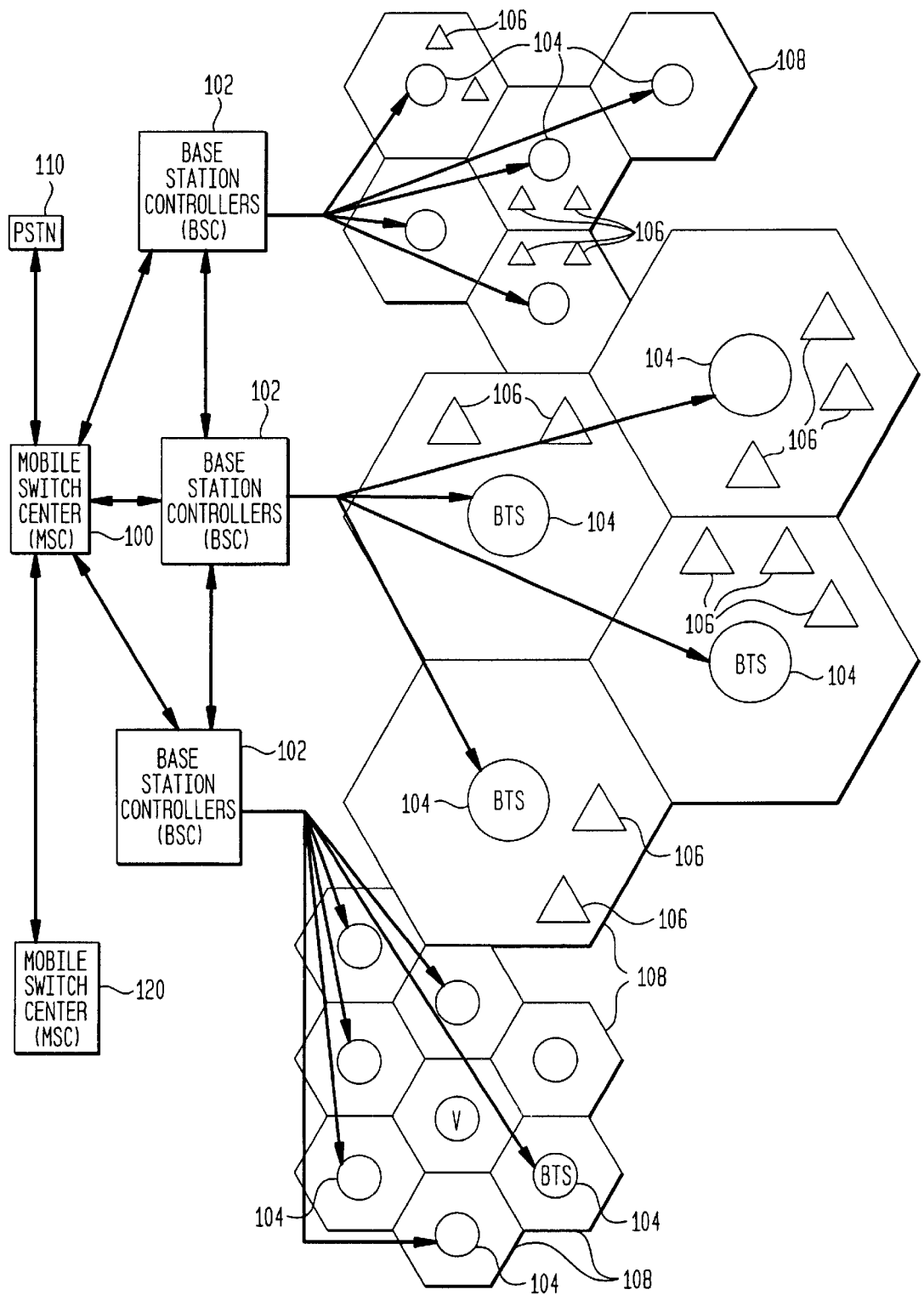
FIG. 1 illustrates a typical structure of a wireless communication system network in which the methodology of the invention can be employed.

FIG. 1 illustrates a typical wireless communications system network configuration containing a Mobile Switch Center (MSC) 100, a plurality of Base Station Controllers (BSC) 102, a plurality of Base Transceiver Stations (BTS) 104 and multiple remote users, each operating a Mobile Station (MS) 106. In addition to providing local management and control functions for BSC 102 remote sites, MSC 100 also provides an interface between the wireless network and a wireline network, PSTN 110, or a second wireless network, MSC 120. BSC 102, in turn, provides local control and management functions for the one or more BTS 104 remote sites, and transfers information between BTS 104 and MSC 100. BTS 104 is the termination point of the radio path on the network side and typically consists of a set of, usually remotely tunable, transceivers placed at the wireless site. Each BTS 104 typically represents one cell 108 in the wireless network and provides local transmission control functions for the one or more MS 106 remote sites within the cell. MSs 106, such as cellular telephones, computer terminals or fax machines, terminate the radio path from BTS 104 and provide the served users with access to the network services. The two-way radio link between BTS 104 and MS 106, by convention, is designated the forward link whenever BTS 104 transmits to MS 106, and the reverse link whenever MS 106 transmits to BTS 104.

Figure 2:
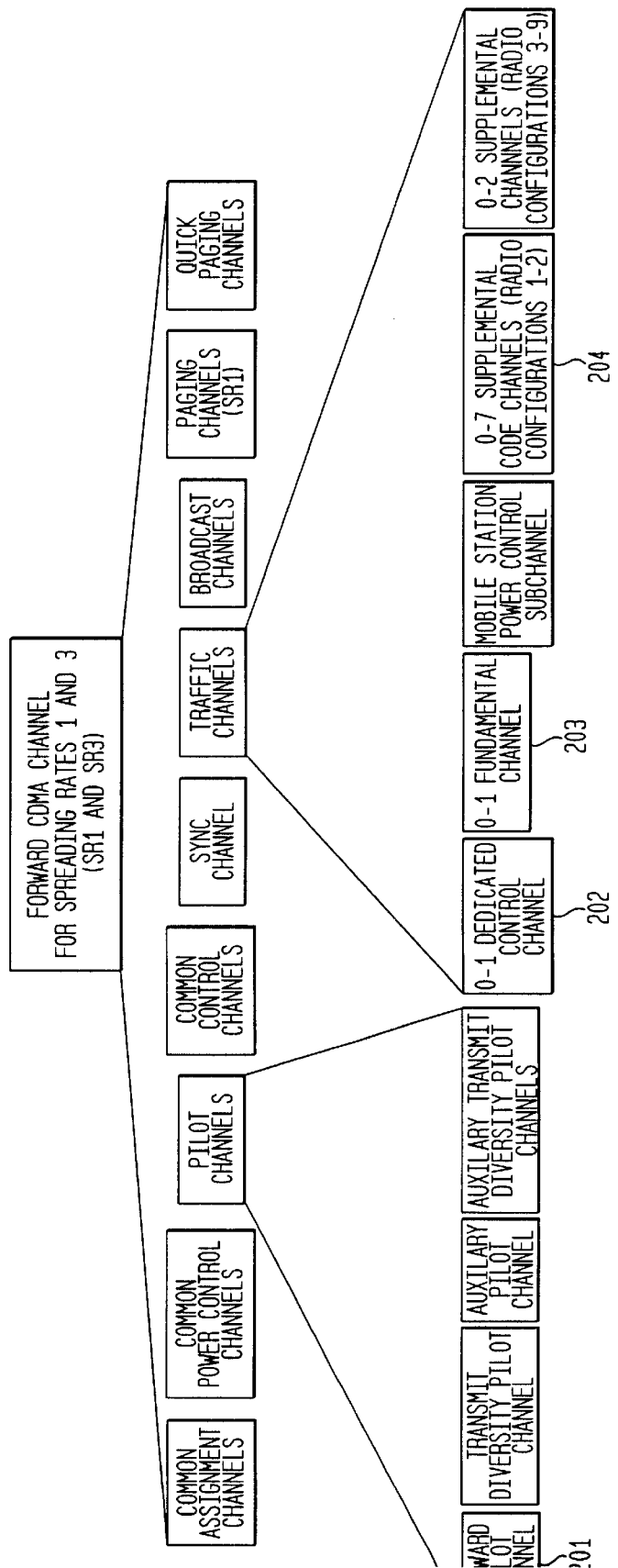
FIG. 2 illustrates the format of the forward channel in a wireless system in which the invention can be employed.

FIG. 2 illustrates a CDMA forward channel multiplexing arrangement as established by the current version of the TIA/EIA/IS-2000.2 standard. A Pilot Channel (PCH) is indicated at 201 and operates to continuously transmit an unmodulated signal in a CDMA system. A PCH provides a phase reference for coherent modulation and a means for signal strength comparisons between BTSs. A Dedicated Control Channel (DCCH) is indicated at 202 and is used for the transmission of digital control information (including power control information) from a BTS to an MS. A Fundamental Channel (FCH) is shown at 203 that carries a combination of two-way voice and power control information. A Supplemental Channel (SCH) is indicated at 204 and operates in conjunction with a DCCH and/or an FCH to provide higher data rate services (or burst data transfer) where higher-level data are transmitted.

In the establishment of a communication link, BTS 104 must allocate a sufficient output power level to provide acceptable signal quality to MS 106. As the forward-link signals in a CDMA system are transmitted in a common frequency band, transmission of high power during the establishment of the communications link increases the overall noise within the cell and increases the interference to the other users in the cell. This increased interference remains until the output power can be adjusted to accommodate the new user's transmission needs. Thus, in establishing the communication link, BSC 102 requests that MS 106 measure the signal strength received using the, always present, known pilot bits transmitted in pilot channel 201. MS 106 measures the received signal strength by using the amplitude values of the pilot bits and returns this measured value to the base station controller. BSC 102, considering the capacity of the base station and other users within the system, uses the measured signal strength to assign the transmission parameters such as transmission data rate, bandwidth, and, nominal initial output power to provide an acceptable quality of service to MS 106.

However, the exchange of protocol messages, which is needed to establish the communication link and assign the burst transmission parameters, represents a processing overhead which takes away system resources that otherwise could be applied to the transmission of user data.

The method of the invention reduces this exchange of messages and the corresponding setup overhead, which delays the setup of the burst transmission parameters, by having MS 106 remote sites autonomously provide, to BSC 102, through BTS 104, system data, such as the measurement of the received signal strength during the period the communication link remains active. The autonomous reporting of the measured received signal strength, for example, provides BSC 102 with a measured parameter that can be used to adjust the assigned burst transmission parameters, such as data rate, bandwidth and nominal initial output power, prior to each burst transmission. Further, the autonomous reporting of the received signal strength enables BSC 102 to adjust the output power and energy per bit during a burst transmission without BSC 102 requesting such a measurement. Adjusting output power during a burst transmission allows the base station to dynamically adjust output power transmission parameters to maintain an acceptable quality of service using a minimum of system resources. According to the method of the invention, adjustment of burst transmission parameters is achieved without expending channel resources to request the received signal strength information from MS 106.

In one embodiment of the invention, the autonomous reporting from MS 106 to BSC 102 may be performed on a periodic basis. The period of reporting may be a function of the rate of arrival of the transmission data. In another embodiment of the invention, the received signal strength may be measured and autonomously reported synchronously with the received burst transmission.

Figure 3:
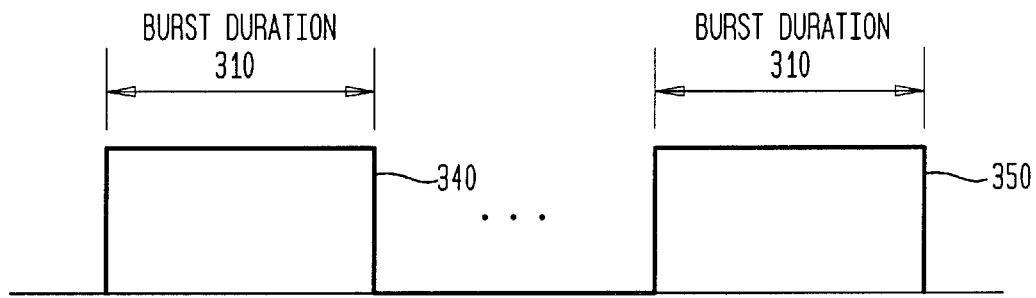
FIG. 3 illustrates the adjustment of burst transmission output power during a burst transmission according to the method of the invention.
Figure 3:
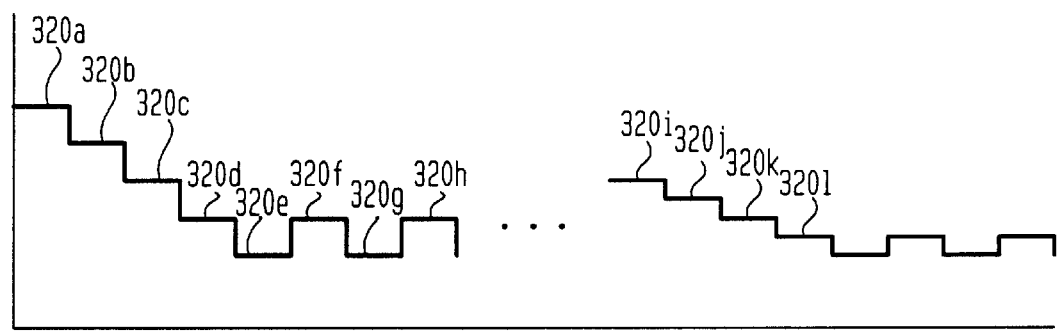
Figure 3:
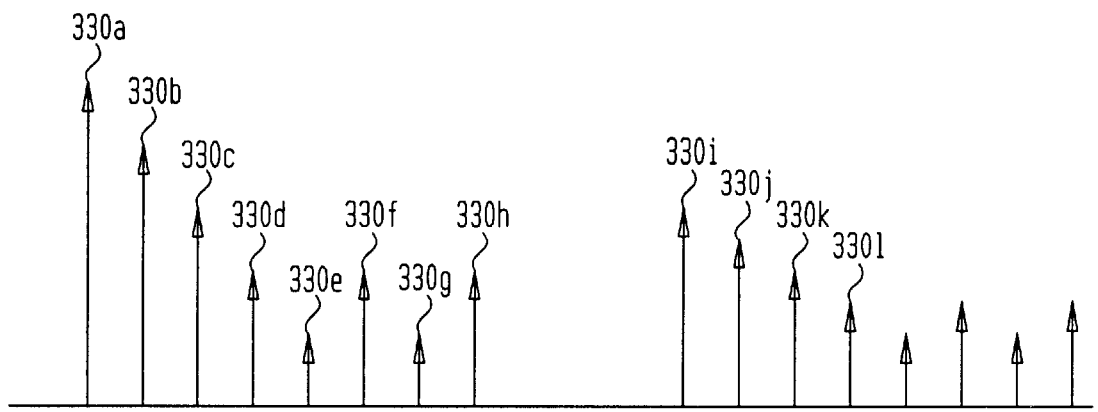

FIG. 3 illustrates an exemplary operation of the method of the invention in which the transmitted output power is adjusted in response to an autonomously generated message from MS 106. As illustrated, two burst transmissions 340 and 350, spaced apart in time are to be transmitted. Each burst has a duration 310 which is the time system resources are needed to transmit the burst. In setting up the transmission parameters for the burst, the transmitter initially sets the transmission output power to a nominal output power level, which in this example is output power level 320a. The nominal output power level, level 320a, is typically chosen to be sufficiently high to insure an acceptable quality of service at the limits of the transmitter's coverage area. With the transmission parameters established, the transmitter then begins transmission of data traffic to MS 106. MS 106, in receiving the data traffic, determines signal parameters, such as received signal strength, and autonomously transmits message 330a, containing signal parameter data, back to the transmitter. In the example illustrated, the autonomous transmission of messages containing signal parameter data is performed periodically—the period here being less than the burst duration 310.

In response to the messages sent by MS 106, the transmitter adjusts the output power level such that an acceptable quality of service is maintained with the expenditure of near optimal resources. In the example of FIG. 3, the transmitter reduces the output power to output power level 320b in response to the returned message 330a. The burst transmission continues at this lesser output power level. MSC 106 continues to measure system parameters and autonomously generates message 330b. In the illustrated example, the transmitter determines from message 330b that the received signal strength is too high and reduces the output power to output power level 320c.

The transmitter and receiver, MS 106, continue this interactive message exchange whereby the transmitter continues to reduce the output power to output power levels 320c, 320d, 320e in response to the autonomously transmitted messages 330b, 330c, 330d, respectively. However, continued reduction of the output power can result in output power levels that are too low for acceptable service.

As is illustrated in FIG. 3, after transmission with output power level 320e, and in response to the returned message 330e, the transmitter increases the output power to output power level 320f. In this case, the transmitter determined that additional output power was necessary because continued transmission at output power level 330e would cause an unacceptable quality of service. In this example, the transmission output power level 320f is raised to the last level that had acceptable quality of service—i.e., output power level 330d. However, the power output level may also be raised as a function of previous output power levels. For example, output power level 320f may be set between output power levels 320d and 320e such that output power level 320f is the average of the levels of 320d and 320e. Alternatively, level 320f may be determined by some other weighted function—e.g., 75% level 320d and 25%level 320e. It should be understood that these settings of the next output power level, whether increasing or decreasing, are intended only as examples and not intended to limit the scope of the invention.

This interactive exchange between transmitter and MS 106 continues for the duration of the burst. That is, the output power level 320 is lowered, whenever received signal strength 330 is determined by the transmitter to be too high—i.e., a waste of system resources, and raised, whenever the received signal strength 330 is determined to be too low—i.e., causing an unacceptable level of service. At the conclusion of the burst the exchange of messages ceases.

In one embodiment of the invention, the last output power level of a previous burst transmission, in this example, 320h, may be retained to be used as a reference in the next burst transmission. As illustrated in FIG. 3, the initial output power level 320i of second burst 350 is set less than the initial nominal output power level 320a. This reduced setting of initial output power level 320i may be a function of the last output power level 320h.

During this second burst 350, MS 106 generates messages 330i, 330j, 330k, and 330l, containing system parameter data, such as received signal strength. In response, the transmitter adjusts the output power to levels 320j, 320k, 330l, 330m, respectively. In this example, the weighting function to determine the amount of decease or increase of output power level can be determined by weighting various factors, such as initial output power and returned signal strength value.

Operationally, the remote site BSC 102 may report its system parameters to the MSC 100 controller. Those system parameters, as measured at MS 106 and/or other BTS 104, include signal strength as well as power consumption history on the forward link and Signal to Interference Ratio (SIR) on the reverse link, for each MS 106 and BTS 104 under the control of the BSC 102. BTS 104 may report the measured system data dynamically to BSC 102, for each MS 106, or it may accumulate and report the measured parameter data of all active MSs 106 in a cell as a single package at one time. This package of measured parameter data of all active MSs may be reported periodically.

The MSC 100, having information on the active data sessions in progress in the network and the operating parameters of each base station, can efficiently assign base station operation in accordance with the changing configuration of the network—e.g., the MS 106 changing position within the network or a new MS requesting access to the network, as well as assigning base station operating conditions dependent upon the base station resource usage.

According to the method of the invention, MS 106 and BSC 102 further maintain time-out counters to clear the active data session if no data is detected for a known period of time. A time-out counter is initiated within the MS 106 after the communications link has been established between the MS 106 and the BSC 102. As each new data burst is received at MS 106 from the BSC 102, the time-out counter is reset. Should no data be received within a known time period after the last received data burst, MS 106 presumes the data session is to be cleared (ended) and therefore initiates its internal clearing function to end the active data session. Hence, BSC 102 need not indicate the end of the data session to MS 106 and thus overhead processing necessary to end a data session is reduced.

Similar to the time-out counters maintained by MS 106, BSC 102 maintains time-out counters to monitor the autonomous reporting of system parameters. As BSC 102 receives the autonomously generated system data message, BSC 102 resets the time-out counters. Should BSC 102 fail to receive an autonomously generated system message within a known time period, BSC 102 presumes the data session is ended and initiates its call clearing function to end the active data session.

CONCLUSION

The invention provides a novel method for providing information from remote sites to local controllers to reduce the time necessary to set up a resource-intensive data transmission. For a preferred embodiment, the invention autonomously provides the signal strength received at a mobile station to an associated base station. The base station uses this information to adjust the transmission parameters for the next data transmission, or to make such adjustment within a given transmission, as appropriate, without burdening channel resources to request this information. Further, the invention causes information concerning system operation to be distributed throughout the network. This system information can be used in assigning base stations when new users request entry to the network or when a mobile station traverses the network and multiple base stations are capable of processing the mobile station. Further still, the invention improves channel utilization by reducing the overhead necessary in establishing, or ending, a communication link between the base station and the mobile station.

Those skilled in the art will recognize that there are many configurations of wireless systems not specifically described herein but for which the methodology of the invention may be applied. Although the invention is described in its preferred embodiments, there is no intention to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The autonomous generation of the signal strength measurement of the invention can also be utilized in second-generation systems, or any system that has high data rate transfer capability.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather than limitation, and that details of the structure may be varied substantially without departing from the spirit of the invention and the exclusive use of all modifications which come within the scope of the appended claims is reserved.

What is claimed:

1. A wireless communication system, having a controller and a plurality of remote sites, said controller being operable with at least one remote site through a communications link, a method of managing system data comprising the steps of:
   a. measuring system data at said at least one remote site; and
   b. reporting said measured system data to said controller, wherein said reporting of measured system data is performed synchronously with data received at said at least one remote site via said communication link without instruction from said controller
   c. wherein said controller operates to adjust transmission parameters for data transmitted to said at least one remote site as a function of said reported data.

2. The method of reporting system data as recited in claim 1, wherein steps a and b are iteratively repeated for said at least one remote site during a time interval.

3. The method of reporting system data as recited in claim 1, wherein steps a and b are iteratively repeated among substantially all of said remote sites within said system.

4. The method of reporting system data as recited in claim 1, wherein said measured system data includes received signal strength at said at least one remote site link.

5. The method of reporting system data as recited in claim 4 wherein measurement of said received signal strength is performed by measuring a level of a pilot signal transmitted to said at least one remote site.

6. The method of reporting system data as recited in claim 1, wherein the step of reporting said measured system data is performed on a periodic basis.

7. The method of reporting system data as recited in claim 1, wherein said communication link includes a forward link and a reverse link.

8. The method of reporting system data as recited in claim 6, wherein said periodic reporting basis is selected as a function of a rate of arrival of data via said communication link at said at least one remote site.

9. The method of reporting system data a recited in claim 8 wherein said reporting basis is less than said rate of arrival of data.

10. The method of reporting system data as recited in claim 7 wherein system data of said forward link includes data collected at each of said at least one remote sites.

11. The method of reporting system data as recited in claim 10 wherein system data of said forward link includes cumulative power history of each of said remote sites.

12. The method of reporting system data as recited in claim 7 wherein system data measured on said reverse link includes the Signal-to-Interference Ratio of each of said remote sites.

13. The method of reporting system data as recited in claim 10 wherein system data of said forward link includes received signal strength measured at each of said remote sites.

14. A method of dynamically managing system data in a wireless communication system, said wireless communication system being characterized by at least one base station and at least one mobile station, said mobile station being in communication with said base station through a communications link, said communication link having a forward link and a reverse link, the method comprising the steps of:
   a. measuring, at said mobile station, base station forward link transmission parameters; and
   b. reporting said transmission parameters to said at least one base station, wherein said reporting is performed synchronously with data received at said mobile station via said communications link without instruction from said at least one base station
   c. wherein said controller operates to adjust transmission parameters for data transmitted to said at least one mobile station as a function of said reported data.

15. The method of reporting system data as recited in claim 14, wherein steps a and b are iteratively repeated for said at least one mobile station during a time interval.

16. The method of reporting system data as recited in claim 14, wherein steps a and b are iteratively repeated among substantially all of said mobile stations within said system.

17. The method of reporting system data as recited in claim 14 wherein said forward link transmission parameters include measured received signal strength.

18. In a wireless communication system, having a controller and a plurality of remote sites, said controller being operable with at least one remote site through a communications link which includes a forward link and reverse link, a method of managing system data comprising the steps of:
   a. measuring system data at said at least one remote site;
   b. reporting said measured system data to said controller, wherein said reporting of measured system date is performed on a periodic basis without instruction from said controller; and wherein said period of reporting is a function of a rate of arrival of data transmitted to said at least one remote site; and
   c. wherein said controller operates to adjust transmission parameters for data transmitted to said at least one remote site as a function of said reported data.

19. The method of reporting system data as recited in claim 18 wherein system data of said forward link includes cumulative power history of each of said remote sites.

20. The method of reporting system data as recited in claim 18 wherein system data of said forward link includes received signal strength measured at each of said remote sites.

21. A method of dynamically managing system data in a wireless communication system, said wireless communication system being characterized by at least one base station and at least one mobile station, said mobile station being in communication with said base station through a communications link, said communication link having a forward link and a reverse link, the method comprising of:
   a. measuring, at said mobile station, base station forward link transmission parameters;
   b. reporting said transmission parameters to said at least one base station, wherein said reporting is performed on a periodic basis without instruction from said at least one base station, wherein said period of reporting is a function of a rate of arrival of data transmitted to said least one mobile station;
   c. wherein said controller operates to adjust transmission parameters for data transmitted to said at least one mobile station as a function of said reported data.

22. The method of reporting system data as recited in claim 21, wherein steps a and b are iteratively repeated for said at least one mobile station during a time interval.

23. The method of reporting system data as recited in claim 21, wherein steps a and b are iteratively repeated among substantially all of said mobile stations within said system.

24. The method of reporting system data as recited in claim 21 wherein said wireless communication system further includes a switching center, said switching center being in communication with said at least one base station, said method further comprising the steps of:
   a. collecting said reported transmission parameter data at said at least one base station;
   b. measuring said reported transmission parameters including signal strength measurements at said at least one base station corresponding to said at least one mobile stations; and
   c. forwarding said reported transmission parameter data to said switching center, said reported transmission parameter data being forwarded without instruction from said switching center.

25. The method of reporting system data as recited in claim 24 wherein said reported transmission parameter data includes measured received signal strength at said mobile station.

26. The method of reporting system data as recited in claim 24, wherein steps a through c are iteratively repeated among substantially all of said base stations within said wireless communication system.

* * * * *